United States Patent
Barnette, Jr. et al.

(10) Patent No.: US 9,696,500 B2
(45) Date of Patent: Jul. 4, 2017

(54) FEMALE HARDENED OPTICAL CONNECTORS FOR USE WITH HYBRID RECEPTACLE

(71) Applicant: Corning Optical Communications LLC, Hickory, NC (US)

(72) Inventors: Robert Elvin Barnette, Jr., Hickory, NC (US); Hieu Vinh Tran, Charlotte, NC (US)

(73) Assignee: Corning Optical Communications LLC, Hickory, NC (US)

( * ) Notice: Subject to any disclaimer, the term of this patent is extended or adjusted under 35 U.S.C. 154(b) by 14 days.

(21) Appl. No.: 13/796,039

(22) Filed: Mar. 12, 2013

(65) Prior Publication Data

US 2014/0064671 A1   Mar. 6, 2014

Related U.S. Application Data

(60) Provisional application No. 61/695,519, filed on Aug. 31, 2012.

(51) Int. Cl.
*G02B 6/38* (2006.01)

(52) U.S. Cl.
CPC ........... *G02B 6/381* (2013.01); *G02B 6/3887* (2013.01); *Y10T 29/49826* (2015.01)

(58) Field of Classification Search
CPC ..... G02B 6/3802; G02B 6/3862; G02B 6/387
See application file for complete search history.

(56) References Cited

U.S. PATENT DOCUMENTS 4,142,776 A * 3/1979 Cherin ................. G02B 6/3803
385/59
4,684,205 A * 8/1987 Margolin ............... G02B 6/381
385/62

(Continued)

FOREIGN PATENT DOCUMENTS

EP        1258758      11/2002
EP        2053433      4/2009
(Continued)

OTHER PUBLICATIONS

US 7,481,586, 01/2009, Lu et al. (withdrawn)
(Continued)

*Primary Examiner* — Charlie Y Peng
(74) *Attorney, Agent, or Firm* — Michael E. Carroll, Jr.

(57) ABSTRACT

A female hardened fiber optic connector for terminating an end of a fiber optic cable that is suitable for making an optical connection with another hardened cable assembly and cable assemblies using the same are disclosed. The female hardened fiber optic connector includes a connector assembly, a crimp body, and a shroud. The crimp body has a first shell and a second shell for securing the connector assembly at a front end of the shells and a cable attachment region rearward of the front end for securing a cable. The crimp body fits within the shroud and is secured within the shroud using a locking feature disposed on a rim area of the shroud. The female hardened connector may further include a receptacle having a non-hardened receptacle port and a hardened receptacle port, where alignment fingers of the female hardened connector fit into distinct openings on the non-hardened receptacle port side.

24 Claims, 13 Drawing Sheets

(56) References Cited

U.S. PATENT DOCUMENTS

| | | | |
|---|---|---|---|
| 5,129,023 A | 7/1992 | Anderson et al. | |
| 5,181,267 A * | 1/1993 | Gerace et al. | 385/86 |
| 5,214,732 A | 5/1993 | Beard et al. | |
| 5,574,815 A * | 11/1996 | Kneeland | 385/101 |
| 6,542,674 B1 | 4/2003 | Gimblet | 385/113 |
| 6,546,175 B1 | 4/2003 | Wagman et al. | 385/113 |
| 6,648,520 B2 | 11/2003 | McDonald et al. | 385/78 |
| 6,714,710 B2 | 3/2004 | Gimblet | 385/113 |
| 6,785,450 B2 | 8/2004 | Wagman et al. | 385/100 |
| 6,899,467 B2 | 5/2005 | McDonald et al. | 385/78 |
| 7,090,406 B2 | 8/2006 | Melton et al. | |
| 7,090,407 B2 | 8/2006 | Melton et al. | 385/62 |
| 7,111,990 B2 | 9/2006 | Melton et al. | 385/53 |
| 7,113,679 B2 | 9/2006 | Melton et al. | 385/113 |
| 7,137,742 B2 | 11/2006 | Theuerkorn et al. | 385/53 |
| 7,244,066 B2 * | 7/2007 | Theuerkorn | G02B 6/3825 385/53 |
| 7,264,402 B2 | 9/2007 | Theuerkorn et al. | 385/59 |
| 7,325,980 B2 | 2/2008 | Pepe | 385/86 |
| 7,338,214 B1 | 3/2008 | Gurreri et al. | 385/55 |
| 7,467,896 B2 | 12/2008 | Melton et al. | 385/87 |
| 7,572,065 B2 | 8/2009 | Lu et al. | 385/78 |
| 7,654,747 B2 | 2/2010 | Theuerkorn et al. | 385/59 |
| 7,677,814 B2 * | 3/2010 | Lu et al. | 385/78 |
| 7,744,288 B2 | 6/2010 | Lu et al. | 385/60 |
| 7,785,015 B2 | 8/2010 | Melton et al. | 385/59 |
| 7,785,019 B2 | 8/2010 | Lewallen et al. | 385/75 |
| 7,794,155 B1 | 9/2010 | Haley et al. | 385/78 |
| 7,881,576 B2 | 2/2011 | Melton et al. | 385/103 |
| 7,918,609 B2 | 4/2011 | Melton et al. | 385/59 |
| 7,942,590 B2 | 5/2011 | Lu et al. | 385/78 |
| 2004/0028343 A1 * | 2/2004 | Hayasaka | 385/60 |
| 2005/0053342 A1 | 3/2005 | Melton et al. | |
| 2006/0045430 A1 | 3/2006 | Theuerkorn et al. | 385/53 |
| 2007/0047877 A1 | 3/2007 | Pepe | 385/86 |
| 2007/0077010 A1 * | 4/2007 | Melton et al. | 385/55 |
| 2008/0050070 A1 | 2/2008 | Gurreri et al. | 385/55 |
| 2008/0175541 A1 | 7/2008 | Lu et al. | |
| 2008/0175546 A1 | 7/2008 | Lu et al. | |
| 2008/0273855 A1 | 11/2008 | Bradley et al. | |
| 2008/0310798 A1 | 12/2008 | Cody et al. | |
| 2009/0269011 A1 * | 10/2009 | Scadden et al. | 385/65 |
| 2010/0284655 A1 | 11/2010 | Nakano et al. | |
| 2010/0322563 A1 | 12/2010 | Melton et al. | |
| 2010/0329611 A1 | 12/2010 | Haley et al. | 385/58 |
| 2011/0075971 A1 | 3/2011 | Elenbaas et al. | 385/55 |

FOREIGN PATENT DOCUMENTS

| | | | |
|---|---|---|---|
| EP | 2159616 | 3/2010 | |
| JP | EP 0156397 A2 * | 10/1985 | G02B 6/3825 |
| WO | WO01/27660 | 4/2001 | |
| WO | EP1367419 | 12/2003 | |
| WO | WO2008021351 | 2/2008 | |
| WO | WO2009073500 | 6/2009 | |
| WO | WO2009131993 | 10/2009 | |
| WO | WO2012/096246 | 7/2012 | |

OTHER PUBLICATIONS

EP Search Report issued in corresponding EP Application No. 13181753.8, dated Feb. 5, 2014.

International Search Report and Written Opinion issued in related Application PCT/US2014/017030, dated Jul. 7, 2014.

* cited by examiner

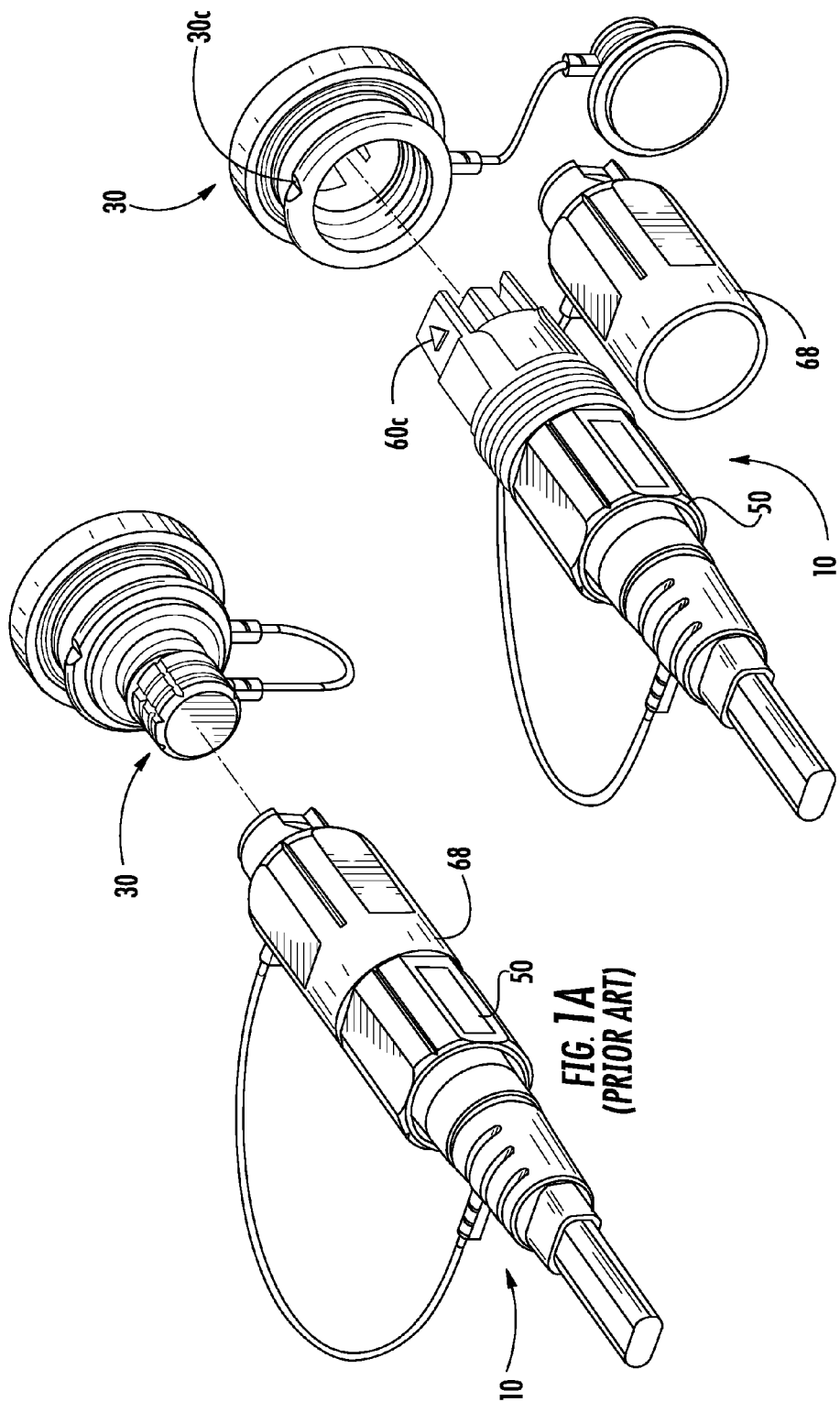

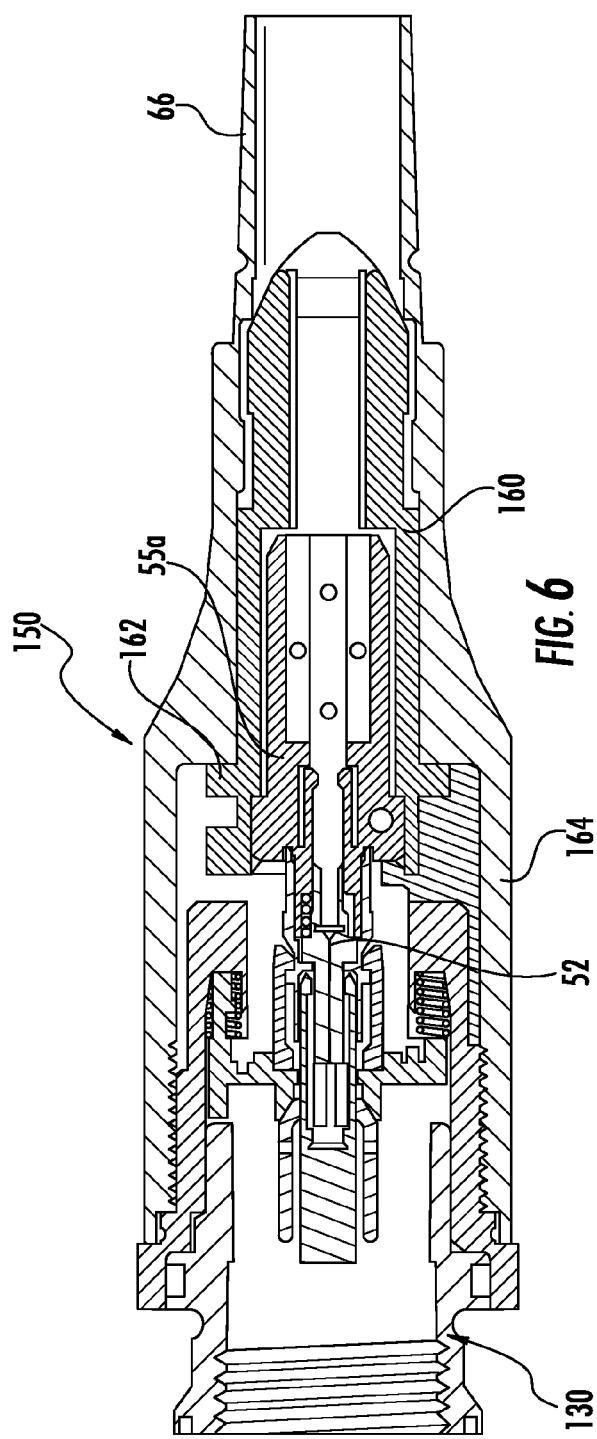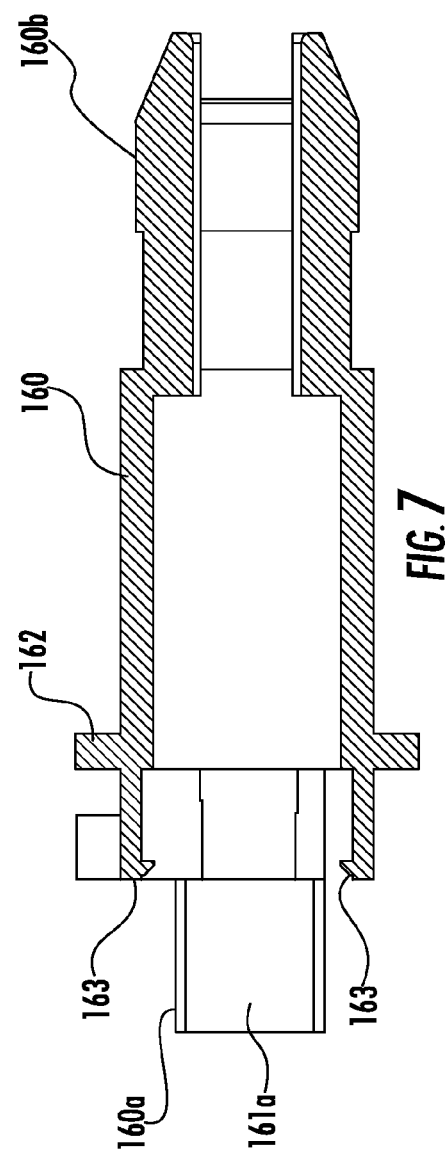

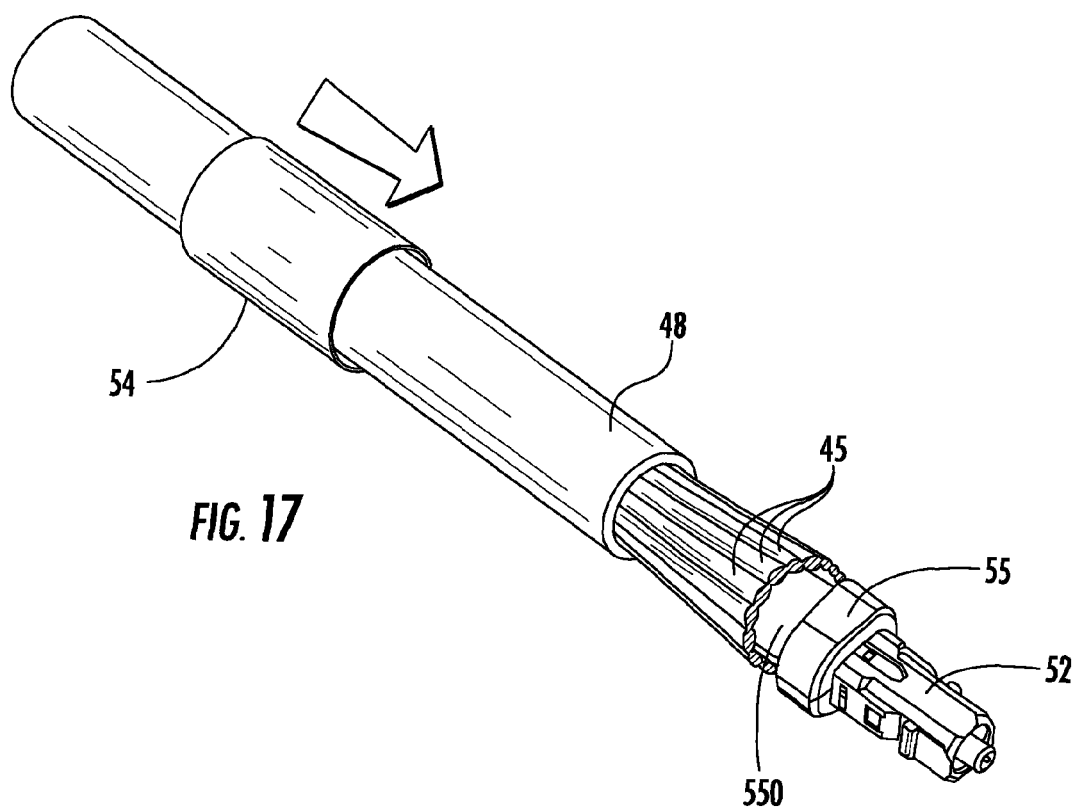

FEMALE HARDENED OPTICAL CONNECTORS FOR USE WITH HYBRID RECEPTACLE

PRIORITY

This application claims the benefit of priority under 35 U.S.C. §119 of U.S. Provisional Application Ser. No. 61/695,519 filed on Aug. 31, 2012 the content of which is incorporated herein by reference in its entirety.

FIELD

The disclosure is directed to female hardened optical connectors and cable assemblies using the same. More specifically, the disclosure is directed to female hardened optical connectors for optical connection with a hardened male plug connector.

BACKGROUND

Optical fiber is increasingly being used for a variety of applications, including but not limited to broadband voice, video, and data transmission. As bandwidth demands increase optical fiber is migrating toward subscribers in outdoor communication networks such as in fiber to the premises applications such as FTTx and the like. To address this need for making optical connections in communication networks for the outside the plant environment hardened fiber optic connectors were developed. One of the most commercially successful hardened fiber optic connectors is the OptiTap® male plug connector sold by Corning Cable Systems, LLC of Hickory, N.C., such as disclosed in U.S. Pat. Nos. 7,090,406 and 7,113,679 (the '406 and '679 patents) the contents of which patents are incorporated herein by reference in their respective entireties. The OptiTap® connector is a hardened male plug connector for terminating a cable that is configured for optical connection using a receptacle. As used herein, the term "hardened" describes a connector or receptacle port intended for making an environmentally sealed optical connection suitable for outdoor use, and the term "non-hardened" describes a connector or receptacle port that is not intended for making an environmentally sealed optical connection.

FIGS. 1A-1C are prior art depictions showing various stages of mating of a preconnectorized cable 10 having an OptiTap® male plug connector with a receptacle 30. Receptacle 30, which is designed to receive the OptiTap® male plug connector, has a first end (not visible in the drawing) that receives a standard SC connector (i.e., a non-hardened receptacle port) and a second end (visible in the drawing) having a hardened receptacle port for receiving the OptiTap® male plug connector, thereby making an optical connection between a hardened connector and a non-hardened connector. Receptacle 30 typically is mounted in a wall of an enclosure with the first end disposed inside the enclosure for environmental protection, and the second end extending outward of the enclosure for connectivity. Receptacle 30 has a first side with a non-hardened receptacle port and a second side with a hardened receptacle port for receiving the OptiTap® male plug connector. Thus receptacle 30 can optically connect the hardened OptiTap® male plug connector with a non-hardened connector such as a standard SC connector. Consequently, a network operator can make an optical connection between, for example, a robust outdoor fiber optic cable assembly to a less robust indoor cable assembly as known in the art.

Due to, for example, installation space available and right-of-way complexity issues some installations require network providers to permit third party access to an existing network so the subscriber may choose among network operators (i.e., a multi-operator option), instead of running entirely new cabling to the subscriber. Thus a third party operator may need to connect a new subscriber to a network that already has an existing drop cable installed and routed to the premises of the subscriber. Consequently, there exists an unresolved need for hardened cable assemblies that can connect subscribers to third party network operators in a quick and reliable manner.

SUMMARY

The disclosure is directed to a female hardened fiber optic connector having a connector assembly, a crimp body with a first shell and a second shell for securing the connector assembly at a front end of the shells and a cable attachment region rearward of the front end. The female hardened fiber optic connector also includes a shroud having alignment fingers on a first end and a locking feature extending from a rim area of the shroud. The crimp body fits within a portion of the shroud and is secured therein by the locking feature. In one embodiment, the locking feature is one or more integrally formed clips on the shroud for securing the crimp body within the shroud. The female hardened fiber optic connector may also further include a female coupling nut. Further embodiments may further include a receptacle such as a hybrid receptacle for receiving alignment fingers of the shroud.

The disclosure is also directed to a method of making a hardened fiber optic connector assembly including providing a fiber optic cable having at least one optical fiber, providing a female hardened fiber optic connector, attaching the at least one optical fiber to the connector assembly, and securing the connector assembly between the first and second shell. The female hardened fiber optic connector includes a connector assembly, a crimp body having a first shell and a second shell for securing the connector assembly at a front end of the shells and a cable attachment region rearward of the front end, and a shroud having alignment fingers on a first end and a locking feature extending from a rim area of the shroud, wherein the crimp body fits within a portion of the shroud and is secured by the locking feature. The locking feature may be formed by one or more integrally formed clips on the shroud used for securing the crimp body within the shroud. Other methods may include providing a female coupling nut for the female hardened fiber optic connector. Still further methods may include providing a receptacle for receiving alignment fingers of the shroud.

The disclosure is further directed to a hardened fiber optic connector assembly including a fiber optic cable having at least one optical fiber and a female hardened fiber optic connector attached to the at least one optical fiber of the fiber optic cable. The female hardened fiber optic connector includes a connector assembly, a crimp body having a first shell and a second shell for securing the connector assembly at a front end of the shells and a cable attachment region rearward of the front end, and a shroud having alignment fingers on a first end and a locking feature extending from a rim area of the shroud, wherein the crimp body fits within a portion of the shroud, and the locking feature is one or more integrally formed clips for securing the crimp body within the shroud. The female hardened fiber optic connector may also further include a female coupling nut. Further embodiments may further include a receptacle such as a hybrid receptacle for receiving alignment fingers of the shroud.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 1A-1C show portions of a conventional preconnectorized fiber drop cable having an OptiTap male plug connector being inserted into and connected with a conventional receptacle;

FIG. 6 is a cross-sectional view of the assembled female hardened connector depicted in FIGS. 4 and 5;

FIG. 7 is a cross-sectional view of the shroud of the female hardened connector depicted in FIG. 5;

FIGS. 15-17 depict methods for attaching strength members of fiber optic cables to the crimp body for making cable assemblies.

DETAILED DESCRIPTION OF THE PREFERRED EMBODIMENTS

Reference will now be made in detail to the preferred embodiments of the disclosure, examples of which are illustrated in the accompanying drawings. Whenever possible, like reference numbers will be used to refer to like components or parts.

The female hardened fiber optic connectors and cable assemblies described herein are suitable for making optical and/or optical-electrical connections (if electrical connections are included in the connectors) to a conventional male hardened connector such as, for one example, the OptiTap male plug connector, but the concepts disclosed may be used with other hardened connectors. The concepts of the disclosure advantageously allow the simple, quick, and economical cable assemblies for deployment by the craft in the field so a subscriber with an existing drop cable may be connected to a third party network for service or the like. Reference will now be made in detail to the preferred embodiments, examples of which are illustrated in the accompanying drawings. Whenever possible, like reference numbers will be used to refer to like components or parts.

Figure 1C:
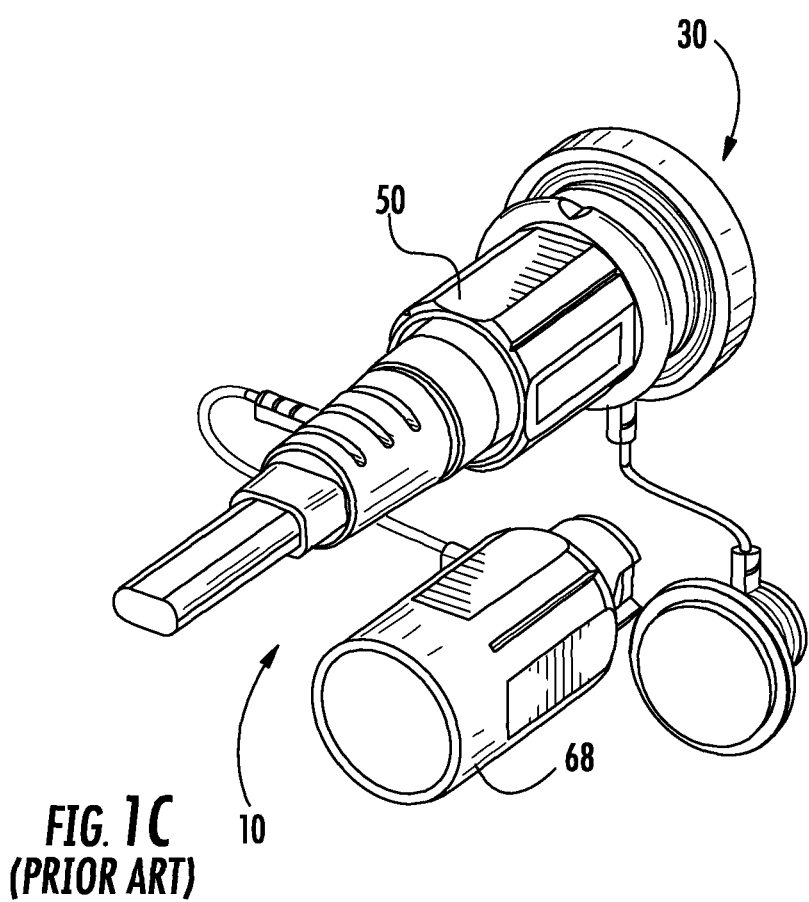
Figure 2:
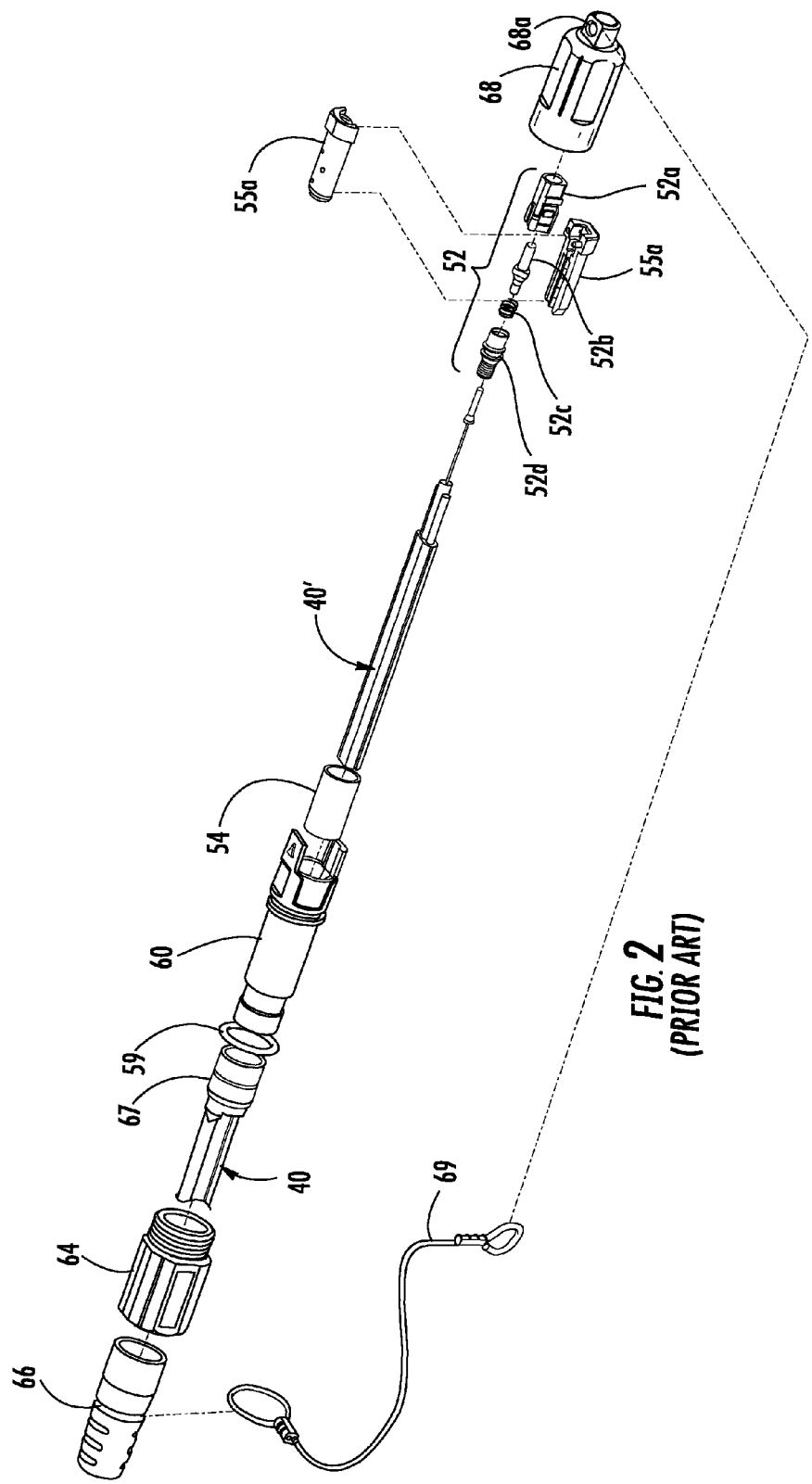
FIG. 2 is a partially exploded view of a preconnectorized cable assembly using the conventional OptiTap male plug connector of FIGS. 1A-1C.

FIG. 2 depicts a partially exploded view of a preconnectorized cable assembly 10 having the conventional OptiTap male plug connector 50 depicted in FIGS. 1A-1C for attachment to cable 40'. Fiber optic cable 40' is disclosed in U.S. Pat. No. 6,542,674, the contents of which are incorporated herein by reference. Conventional male plug connector 50 includes by way of example an industry standard SC type connector assembly 52 having a connector body 52a, a ferrule 52b in a ferrule holder (not numbered), a spring 52c, and a spring push 52d. Conventional male plug connector 50 also includes a crimp assembly (not numbered) that includes a crimp housing having at least one shell 55a and a crimp band 54, a shroud 60 having one or more O-rings 59, a coupling nut 64 having external threads, a cable boot 66, a heat shrink tube 67, and a protective cap 68 secured to boot 66 by a wire assembly 69. Male plug connector 50 is a hardened connector used for drop cable assemblies to subscribers.

Figure 3:
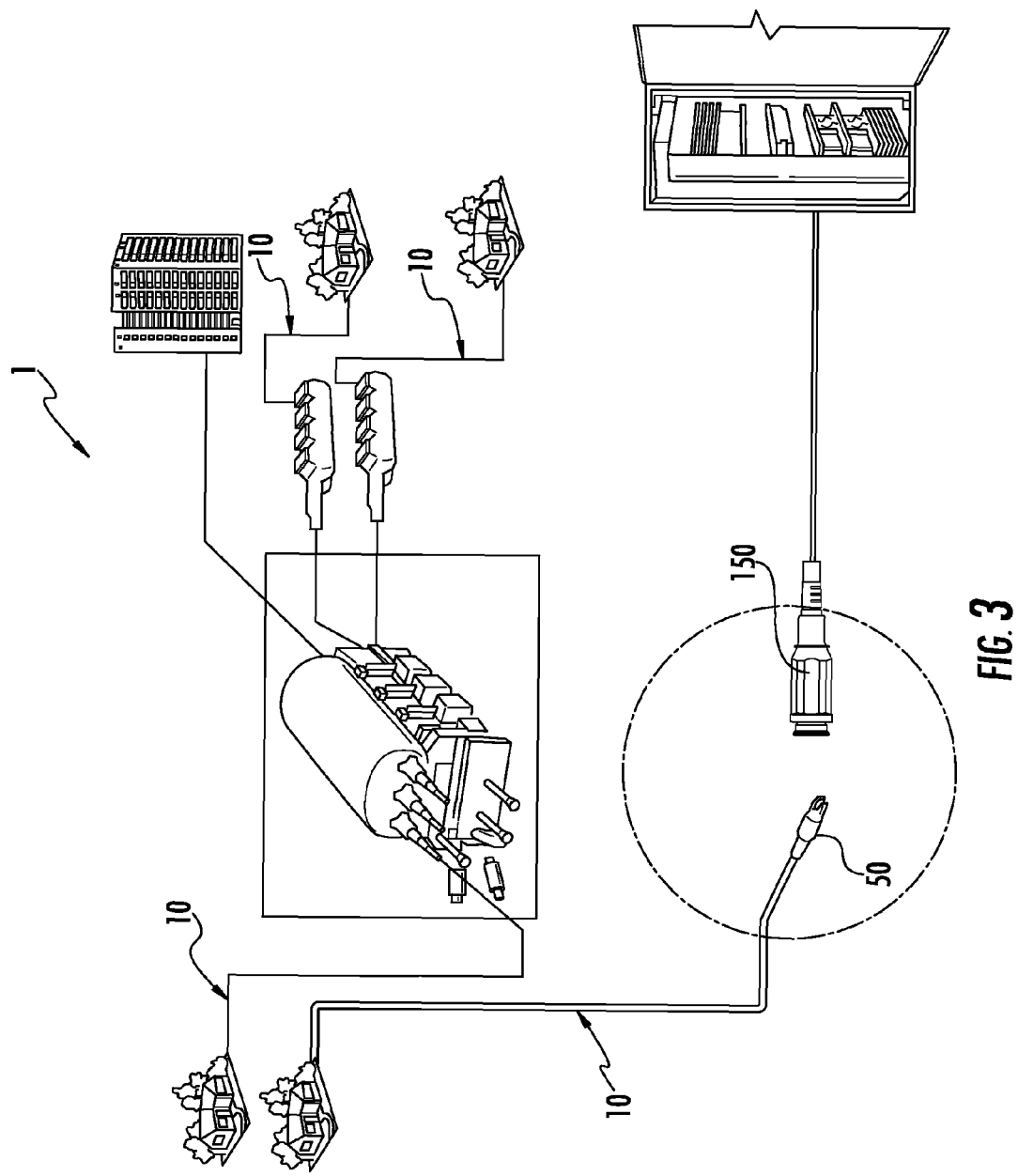
FIG. 3 is simplified schematic of a portion of an optical network showing a preconnectorized female hardened connector that is suitable for optical connection with the conventional OptiTap male plug connector.

FIG. 3 depicts a simplified schematic showing a portion of a multi-operator optical waveguide network 1 in an exemplary fiber to the location 'x' (FTTx). 'x' in the acronym represents the end location of the optical waveguide, for instance, FTTC means fiber to the curb. In this case, the network 1 is a fiber to the premises (FTTP) application.

FTTP architectures advantageously route at least one optical waveguide to the premises, thereby providing a high bandwidth connection to the subscriber. Moreover, applications to locations other than to the curb or premises are also possible. Downstream from a central office (CO), network 1 includes one or more links that connect to a network access point (NAP) in the network such as an aerial closure, multiport, or the like. As shown, drop link comprises a preconnectorized fiber optic drop cable 10 (hereinafter referred to as a "preconnectorized cable") suitable for outdoor environments that is routed to the NAP of a first service provider for optical connection. The NAP typical uses a receptacle having a first side with a hardened receptacle port that extends externally of NAP and a second side having a non-hardened receptacle port that extends within the NAP and is protected from the outdoor environment. However, a subscriber may wish to receive service from a different (i.e., second) service provider (i.e., a competitor installation) using the existing drop cable running to the premises, instead of the first service provider. Consequently, the OptiTap male plug connector 50 of the drop link needs to be connected to a suitable interface. The concepts of the present disclosure provide a female hardened optical connector 150 along with preconnectorized cable assemblies using the female hardened connector that efficiently and economically streamlines the deployment and installation for multi-operator solutions into the last mile of the fiber optic network such as to the premises so that the operators and installers can easily change service providers. As used herein, "female hardened connector" means that a ruggedized outdoor connector that can mate with a male hardened connector. Although, network 1 shows a simplified configuration of one type of FTTx architecture, other networks can employ the embodiments and concepts of the disclosure. Other networks may include other suitable components such as distribution closures, amplifiers, couplers, transducers, or the like. Likewise, other networks besides FTTx architectures can benefit from the concepts of the disclosure.

As shown, FIG. 3 depicts preconnectorized cable assemblies 10 having conventional male plug connectors 50 as drop cable assemblies for optical connection to subscribers 5. For multi-operator networks, the third party operator may need to connect to an existing conventional male plug connector 50. The present disclosure includes female hardened connectors 150 suitable for optical connection with the male hardened connector 50 of preconnectorized cable assembly 10.

As depicted by FIG. 3, the third party operator may only have access to connect the new subscriber by making the optical connection with the existing male hardened connector that is already routed to the subscriber. In other words, the drop cable to the subscriber is disconnected (i.e., unplugged) from the first network operated by a first network operator at a NAP terminal such as a multi-port or aerial disclosure. Thereafter, if the subscriber wishes to use a different third-party network operator to provide new service they must connect to the existing drop due to right-of-way, convenience, or other concerns.

Figure 4:
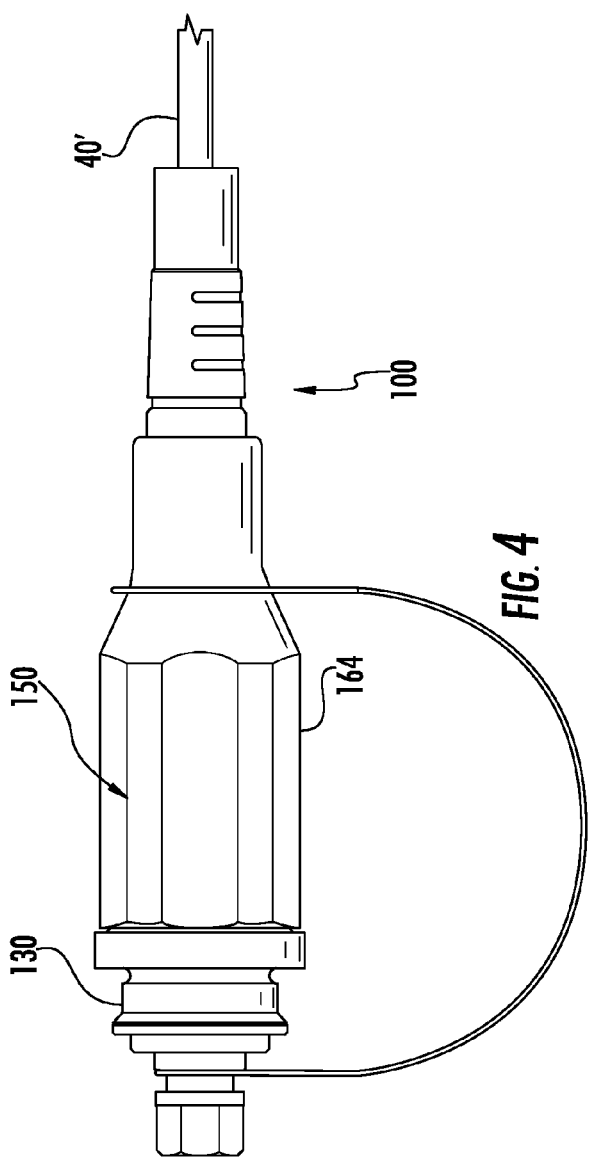
FIG. 4 is a close-up side view of a female hardened connector attached to a fiber optic cable according to the concepts disclosed herein.

FIG. 4 is side view of a preconnectorized cable assembly having a female hardened connector 150 attached to a fiber optic cable 40', thereby forming a hardened fiber optic cable assembly 100. Female hardened connector 150 also has a receptacle 130 attached thereto via a female coupling nut 164. Consequently, the female hardened fiber optic cable assembly 100 may be optically coupled with an OptiTap male plug connector if a change in service providers is desired. Simply stated, the existing drop link 10 of FIG. 3 may be disconnected from the NAP or other location and then the hardened male plug such as the OptiTap male plug connector 50 or the like may be optically connected to the female hardened cable assembly 100 having the female hardened connector 150 of the present disclosure.

Figure 5:
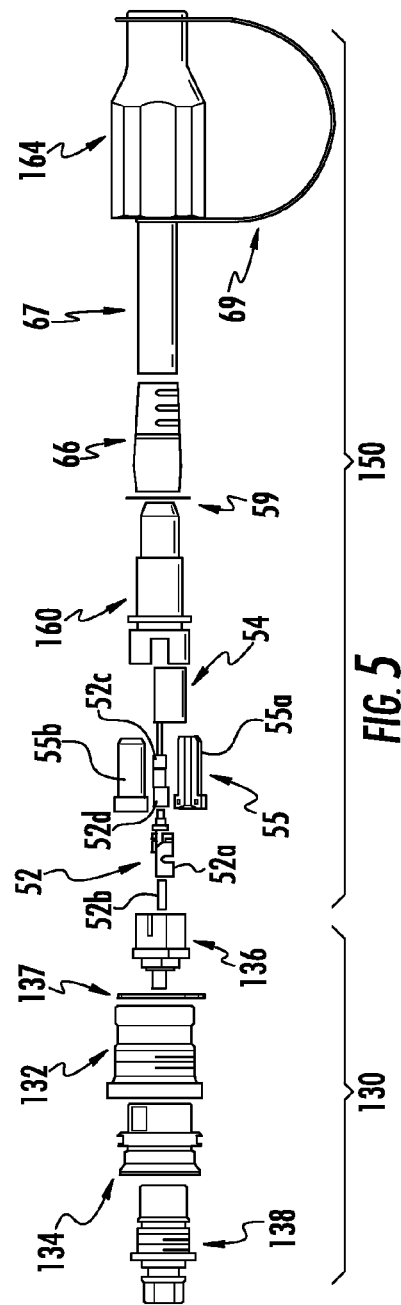
FIG. 5 is an exploded view of the female hardened connector of FIG. 4.

FIG. 5 is an exploded view and FIG. 6 is a cross-sectional view of the female hardened connector 150 and receptacle 130 of FIG. 4. For complexity reduction and simplification, the female hardened connector 150 can use many of the same parts as the OptiTap male plug connector 50 or other standard parts as desired; however, certain components are specific female hardened connector 150. By way of example, female hardened connector 150 includes an industry standard SC type connector assembly 52 or the like having a connector body 52a, a ferrule 52b in a ferrule holder (not numbered), a spring 52c, and a spring push 52d, similar to the exemplary OptiTap male plug connector. Female hardened connector 150 may also include a crimp body 55 having at least one shell 55a (preferably two shells 55a) and an optional crimp band 54, a shroud 160 that may have one or more O-rings or gaskets 59, a female coupling nut 164, along with a cable boot 66, a heat shrink tube 67, and an optional lanyard 69 as desired. Although, the term crimp body is used the body does not require a crimp or crimp band and may use other securing means such as adhesive or the like for securing the shells 55a together. Receptacle 130 may include a receptacle body 132, an insert 134, a sleeve 136 (which may or may not be biased by a spring), a gasket 137, and a dust cap 138, but other suitable configurations are possible.

Generally speaking, most of the components of female plug connector 150 and/or receptacle 130 are preferably formed from a suitable polymer, but other materials such as metal are possible. Preferably, the polymer is a UV stabilized polymer such as ULTEM 2210 available from GE Plastics if the component is exposed to the elements; however, other suitable polymer materials may be used. For instance, stainless steel or any other suitable metal may be used for various components as desired.

FIG. 7 is a cross-sectional view of the shroud 160 of the female hardened connector 150. Shroud 160 is elongate and annular and when fully assembled the crimp body 55 fits into shroud 160 and is retained by a locking feature 163. Locking feature 163 may extend from a rim area (not numbered) on the front-side of a shoulder 162 of the shroud 60. In an exemplary embodiment, the locking feature 163 has one or more integrally formed clips extending from the rim area of the shroud 160. As shown, the locking feature 163 may be disposed radially inward of alignment fingers 161a, 161b. Generally speaking, the locking feature 163 is configured as an inwardly facing ridge or tooth that is canted in the rearward direction of the shroud for securing the crimp body therein. In other words, as the crimp body is inserted into the shroud it slightly deflects the locking feature 163 (e.g., radially deflects the cantilevered arms having the locking feature) until the crimp body passes the locking feature 163 and the arms having the ridge or tooth spring back to their undeflected positions for securing the crimp body within the shroud 160 as shown in FIG. 6. This embodiment depicts the locking features 163 as two arms extending from the rim area disposed about 180 degrees apart degrees apart, and are configured to avoid interference with the structure of the non-hardened receptacle port of receptacle 130, but other locking features are possible.

Additionally, crimp body 55 is keyed to direct insertion into shroud 160 in the correct orientation. In this case, shells 55a include planar surfaces on opposite sides of crimp body 55 to inhibit relative rotation between crimp body 55 and shroud 160. In other embodiments, the crimp body 55 may be keyed to the shroud 160 using other configurations such as a complementary protrusion/groove or the like.

Shroud 160 has a generally cylindrical shape with a first end 160a and a second end 160b. Shroud 160 generally protects connector assembly 52 and in preferred embodiments also keys female hardened connector 150 with the receptacle 130 as further discussed below. Moreover, shroud 160 includes a through passageway between first and second ends 160a and 160b. The passageway of shroud 160 is keyed so that crimp body 55 is inhibited from rotating when female hardened connector 150 is assembled. Additionally, the passageway has an internal shoulder (not numbered) that inhibits the crimp assembly from being over-traveled beyond a predetermined position.

Figure 8:
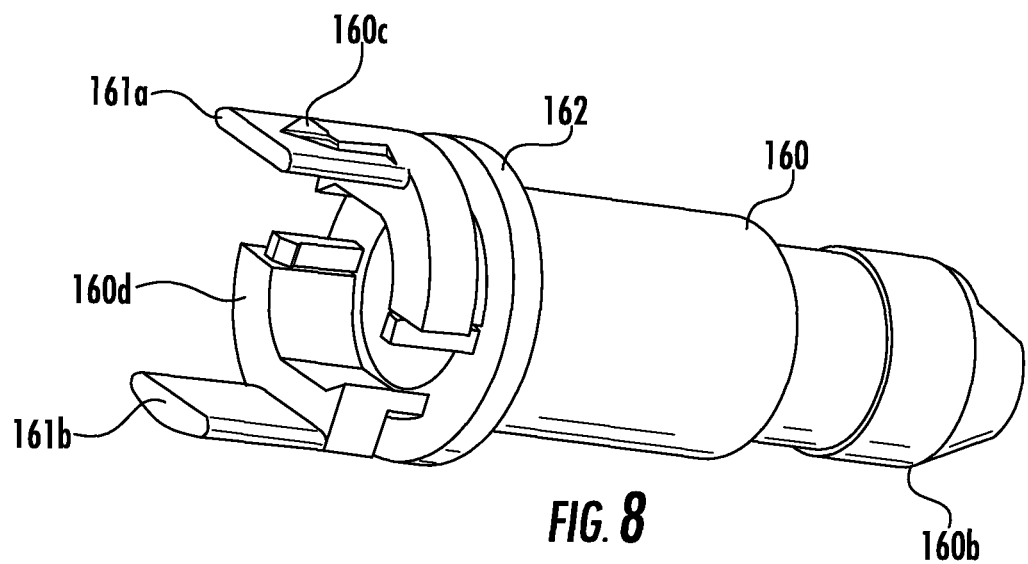
FIGS. 8 and 9 respectively are perspective views of the shroud of the female hardened connector of FIGS. 4 and 5.
Figure 9:
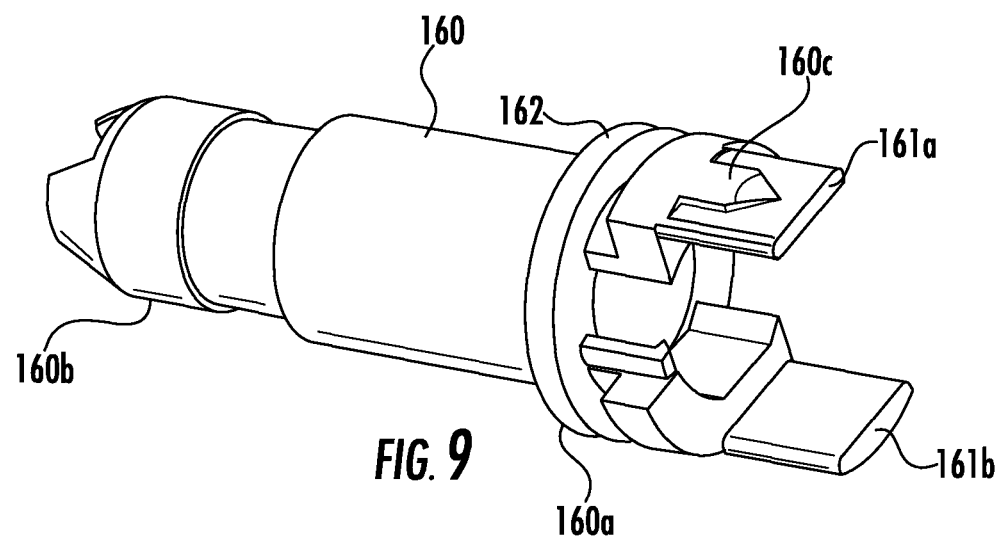
Figure 11:
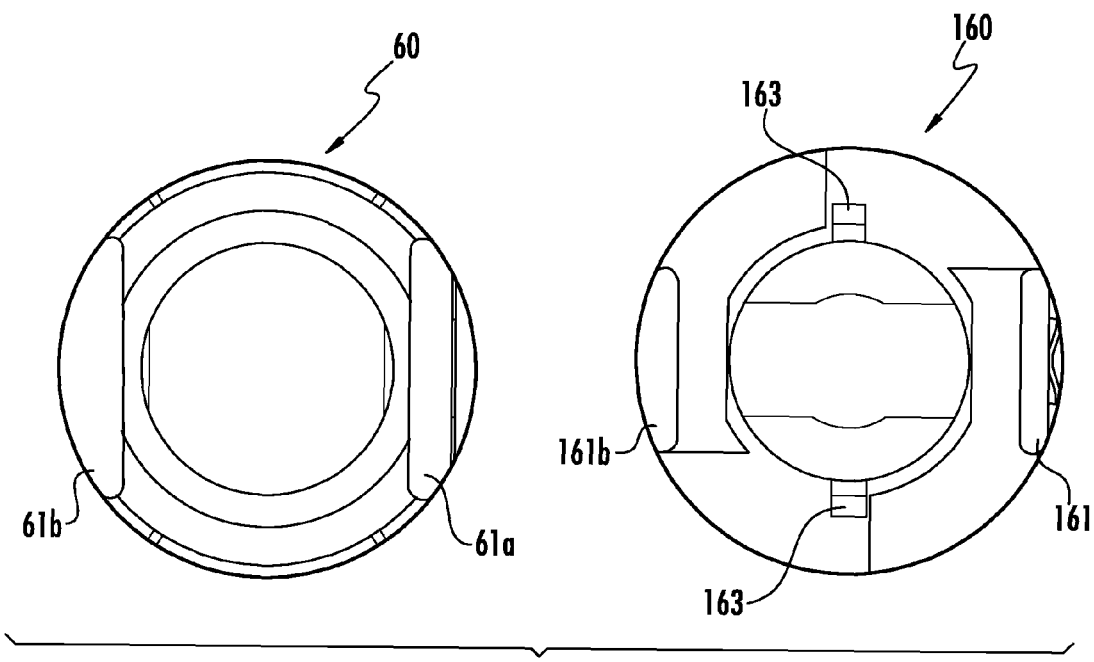
FIG. 11 includes end views of the shroud of the conventional male hardened connector of FIG. 2 and the shroud of the female hardened connector of FIGS. 4 and 5.
Figure 13:
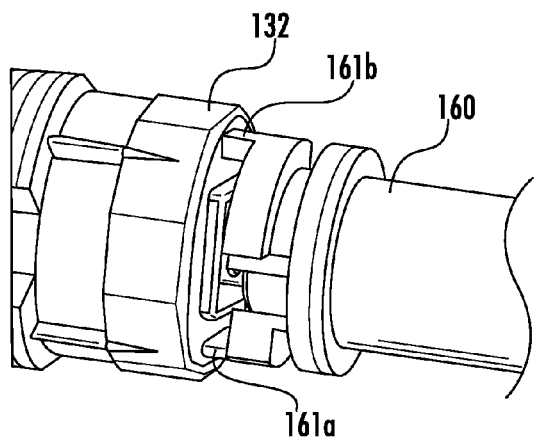
FIG. 13 is a perspective view showing the details of shroud of the female hardened connector of FIGS. 4 and 5 being attached to the non-hardened side of the receptacle.

As best shown in FIGS. 8 and 9, first end 160a of shroud 160 includes at least one opening (not numbered) defined by shroud 160. The at least one opening extends from a medial portion of shroud 160 to first end 160a. In this case, shroud 160 includes a pair of openings on opposite sides of first end 160a, thereby defining alignment portions or fingers 161a, 161b. In addition to aligning shroud 160 with the non-hardened receptacle port on the first side of receptacle 130 during mating, alignment fingers 161a, 161b may extend slightly beyond connector assembly 52, thereby protecting the same. As best shown in FIG. 11, alignment fingers 161a, 161b have different shapes so female plug connector 150 and receptacle 130 only mate in one orientation. Receptacle body 132 has two openings with similar spacing and shapes for receiving the alignment fingers 161a, 161b of shroud 160 therein. Consequently, the shroud 160 and female hardened connector 150 is keyed to fit into the receptacle body 132 of receptacle 130. In preferred embodiments, this orientation is marked on shroud 160 using alignment indicia 160c (FIG. 9) so that the craftsman can quickly and easily mate preconnectorized cable 100 with receptacle 130. In this case, alignment indicia 160c is, for example, an arrow molded into the top alignment finger of shroud 160, however, other suitable indicia may be used. As shown, the arrow may align with complimentary alignment indicia disposed on receptacle 130, thereby allowing the craftsman to align indicia so that alignment fingers 161a, 161b can be seated into the openings of receptacle 130 such as shown in FIG. 13. Thereafter, the craftsman engages the internal attachment feature 164a such as internal threads of female coupling nut 164 with the complimentary external threads of receptacle 130 as best shown in FIG. 6 for making the assembly shown in FIG. 4.

A medial portion of shroud 160 has a shoulder 162 for seating a gasket 59. Gasket 59 provides a weatherproof seal between shroud 160 and female coupling nut 164. Shoulder 162 also provides a stop for female coupling nut 164. Female coupling nut 164 has a passageway sized so that it fits over the second end 160b of shroud 160 and easily rotates about the medial portion of shroud 160. In other words, female coupling nut 164 cannot move beyond shoulder 162, but female coupling nut 164 is able to rotate with respect to shroud 160. Second end 160b of shroud 160 includes a stepped down portion having a relatively wide groove (not numbered). This stepped down portion and groove are used for securing heat shrink tubing 67. Heat shrink tubing 67 is used for weatherproofing the preconnectorized cable assembly. Specifically, the stepped down portion and groove allow for the attachment of heat shrink tubing 67 to the second end 160b of shroud 160. The other end of heat shrink tubing 67 is attached to a cable jacket, thereby inhibiting water from entering female hardened connector 150.

Figure 10:
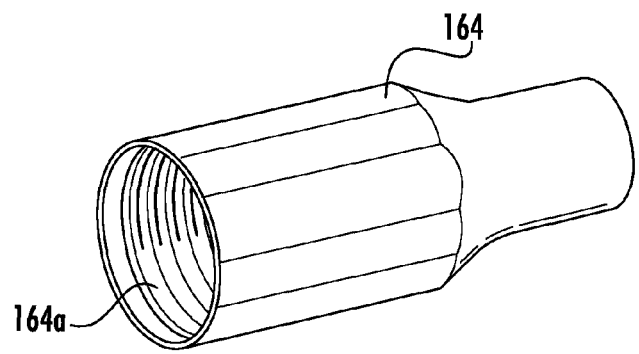
FIG. 10 is a perspective view of the female coupling nut of the female hardened connector of FIGS. 4 and 5.

FIG. 10 is a perspective view of the female coupling nut 164. As shown, female coupling nut 164 includes a first barrel portion that necks down to a second barrel portion. The first barrel portion includes the internal attachment feature such as internal threads with the complimentary external threads of receptacle 130. Once receptacle 130 is attached to the female hardened connector 150 the assembly is suitable for making an optical connection with an OptiTap male plug connector 50 and providing an optical connection therebetween such as for a third-party network operator to provide service over a previously installed drop cable After the heat shrink tubing 67 is attached, boot 66 may be slid over heat shrink tubing 67 and a portion of shroud 160. Boot 66 is preferably formed from a flexible material such as KRAYTON. Heat shrink tubing 67 and boot 66 generally inhibit kinking and provide bending strain relief to the cable near female hardened connector 150. Boot 66 has a longitudinal passageway (not visible) with a stepped profile therethrough. The first end of the boot passageway is sized to fit over the second end of shroud 160 and heat shrink tubing 67. The first end of the boot passageway has a stepped down portion sized for cable 40' or other suitable cable that may be used and the heat shrink tubing 67 and acts as stop for indicating that the boot is fully seated. After boot 66 is seated, female coupling nut 164 is slid up to shoulder 162 so that an optional lanyard 69 can be secured to the assembly. A second end of lanyard 69 may be secured to dust cap 138 of the receptacle 130 as desired. Consequently, dust cap 68 is prevented from being lost or separated from preconnectorized cable 100. Dust cap 68 has external threads for engaging the internal threads of receptacle insert 134. Moreover, the cap may include an O-ring for providing a weatherproof seal between receptacle 130 and dust cap 68 when installed.

Figure 12:
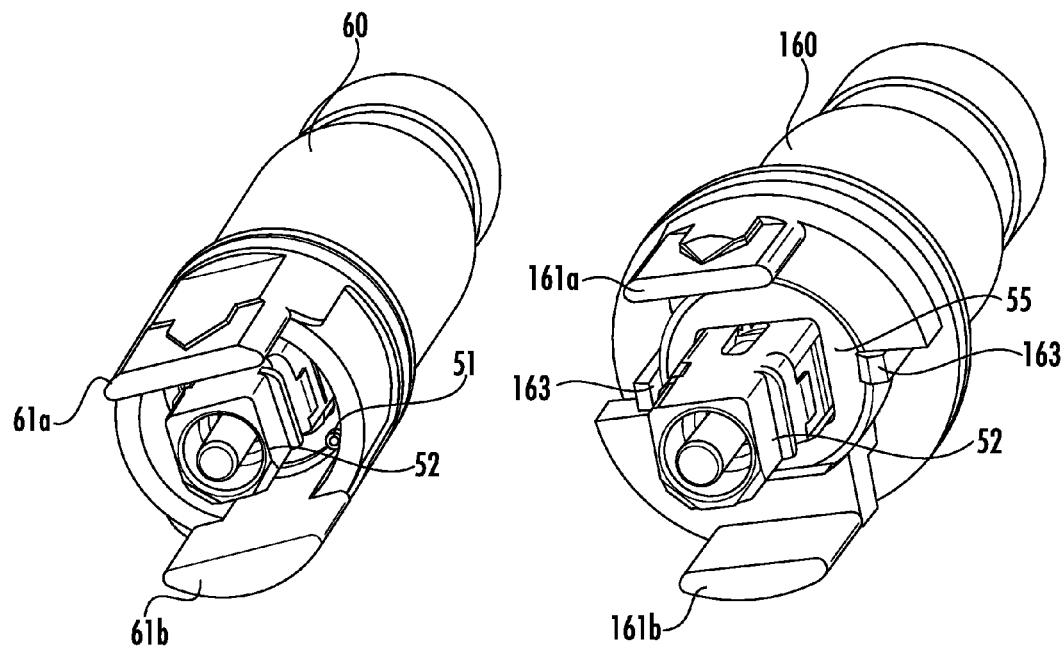
FIG. 12 is a side-by-side comparison of end views of a partially assembled conventional OptiTap male plug connector of FIG. 2 and a partially assembled female hardened connector of FIGS. 4 and 5.

FIG. 11 is a side-by-side end view comparison of the shroud 60 of the conventional OptiTap male hardened connector 50 and the shroud 160 of female hardened connector 150. As shown, the alignment fingers 161a, 161b of shroud 160 has a larger spacing between the fingers and different cross-sectional shapes compared with the alignment fingers 61a, 61b of shroud 60. Thus, the alignment fingers 161a, 161b of shroud 160 can be seated into the openings of receptacle 130 such as shown in FIG. 13. Moreover, the openings (not numbered) from the medial portion of shroud 160 to first end 160a extend from the front-side of shoulder 162 (i.e., the rim area) to the first end 160a. The cantilevered arms of locking features 163 are detached (i.e., spaced apart) from the adjacent extending portions at the first end 160a as shown so that the arms can deflect and spring back for securing the crimp body 55 when inserted into the shroud 160. FIG. 12 is a side-by-side comparison of perspective end views of a partially assembled conventional OptiTap male hardened connector 50 and a partially assembled female hardened connector 150. As shown, locking features 163 secure the crimp body 55 within the shroud 160 as described herein without any tools by simply pushing the crimp body 55 into shroud 160, whereas the shroud 60 of the conventional OptiTap male connector plug uses a clip 51 for securing the crimp body 55, which can be difficult to seat and may requires a tool.

Figure 14:
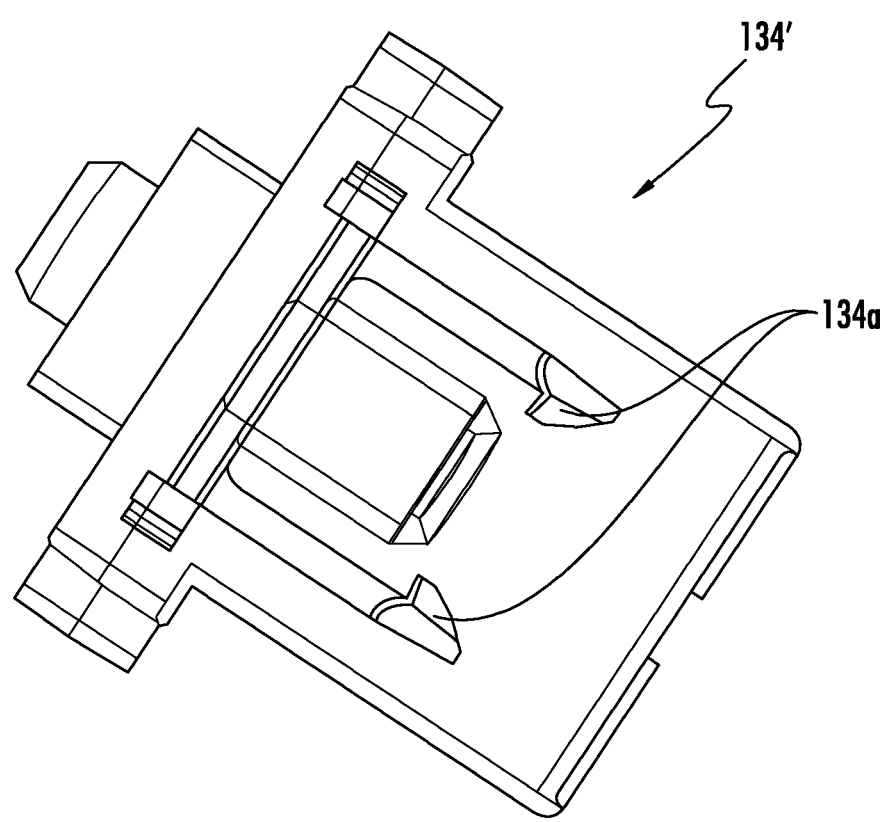
FIG. 14 is a cross-sectional view showing an optional latching feature for the receptacle insert for securing the female hardened connector in the receptacle.

FIG. 13 is a perspective view showing the alignment fingers 161a, 161b of shroud 160 seated into the openings of receptacle body 132 on the non-hardened side of the receptacle 130. The alignment fingers 161a, 161b are received into discrete openings of the receptacle body 132 in only one orientation for keying the female hardened connector 150 with receptacle 130. FIG. 14 is a cross-sectional view showing an alternative receptacle insert 134' having optional latching features 134a for securing the female hardened connector 150 in the receptacle 130. However, in may be advantageous to not use alternative receptacle insert 134' since it may be desirable to remove the female hardened connector 150 from the receptacle 130 to clean the female hardened connector 150.

Preconnectorized cable 100 may have any suitable length desired; however, preconnectorized cable 100 can have standardized lengths. Moreover, preconnectorized cable 100 may include a length marking indicia for identifying its length. For instance, the length marking indicia may be a marking located on the cable such as a colored stripe or denoted in a print statement. Likewise, the length marking indicia may be a marking located on female hardened connector 150. In one embodiment, length marking indicia may be denoted by a marking on female coupling nut 164 such as a colored stripe. In any event, the length marking indicia should be easily visible so the craftsperson may identify the preconnectorized cable length. By way of example, a red marking indicia on female coupling nut 164 denotes a length of about 50 feet while an orange marking indicia denotes a length of about 100 feet.

The described explanatory embodiment provides an optical connection that can be made in the field between a male plug connector 50 and the female hardened connector 150 disclosed herein without any special tools, equipment, or training. Additionally, the optical connection is easily connected or disconnected by merely mating or unmating the connector on the ends of preconnectorized cable 10 with the female hardened connector assembly 100 by threadably engaging or disengaging the coupling nut on the OptiTap male plug connector 50 with the internal threads of the receptacle 130. Thus, the female hardened connectors disclosed allow deployment of a third party network provider to an existing cable assembly having an OptiTap male plug connector of the subscriber such as in fiber to the location 'x' in an easy and economical manner, thereby providing the end user with an option among service providers. Furthermore, the concepts disclosed can be practiced with other fiber optic cables, connectors and/or other preconnectorized cable configurations.

Figure 15:
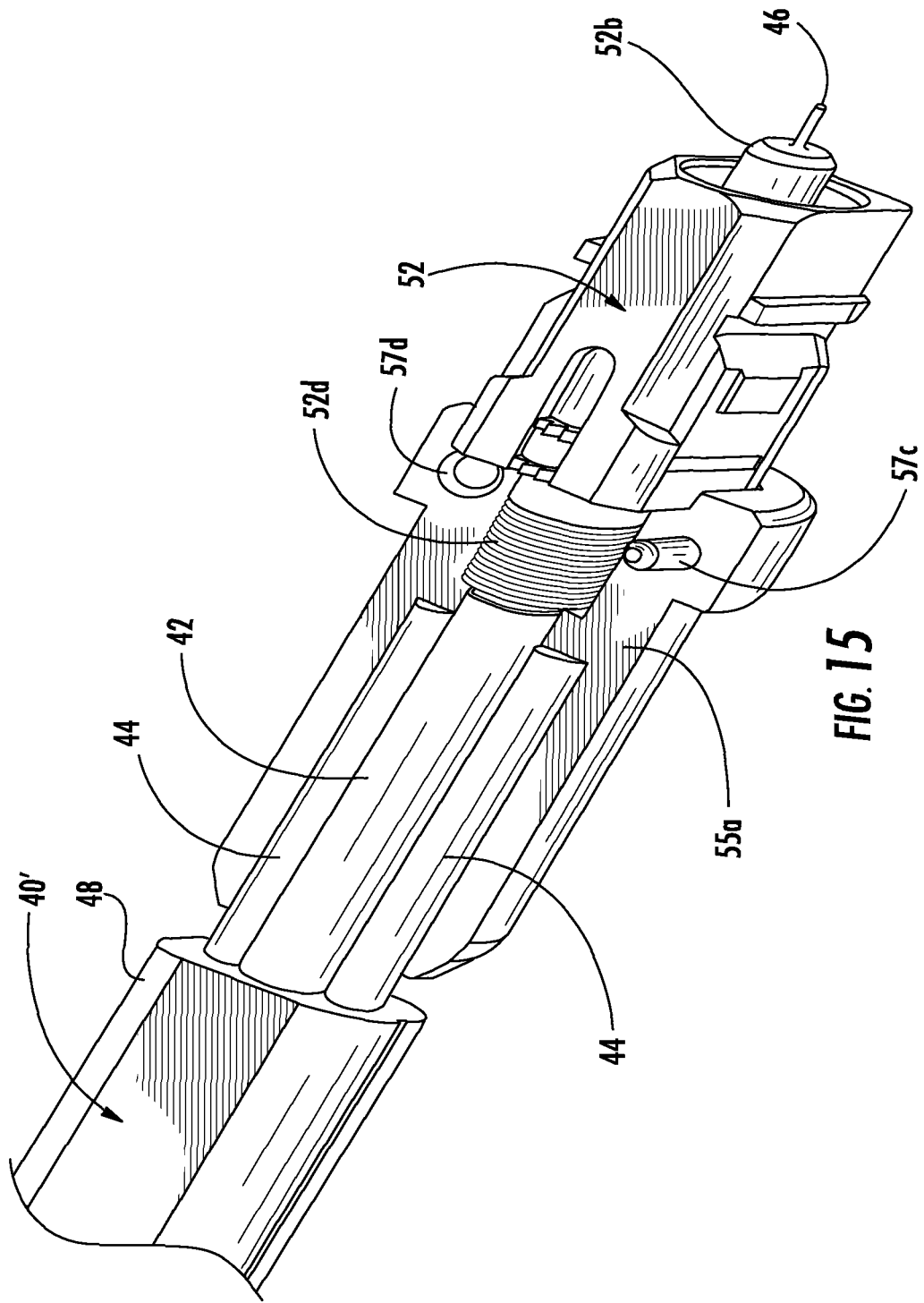
Figure 16:
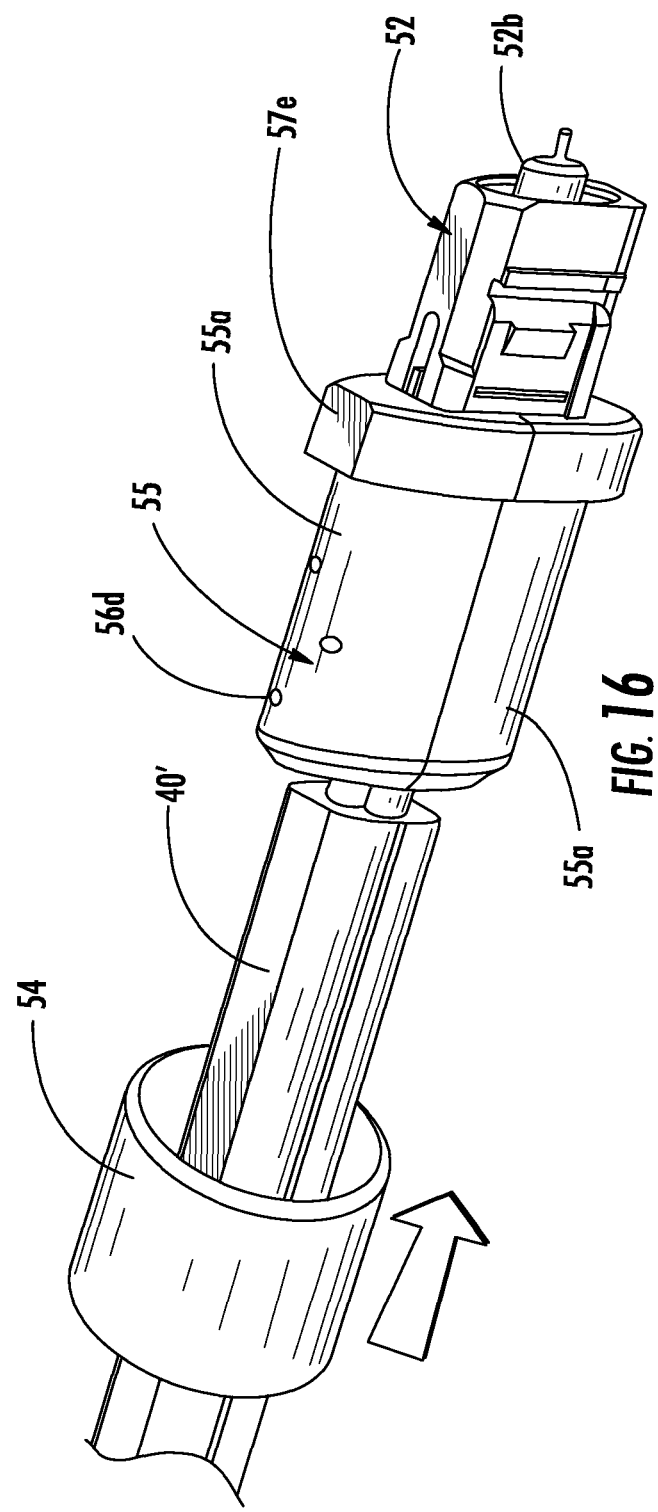

FIGS. 15-17 depict different methods for attaching tensile elements of fiber optic cables to the crimp body 55 for making cable assemblies using female hardened connector 150. The female hardened connectors 150 disclosed herein are advantageous since they may connnectorize various different types of cable constructions such as flat cables or round cables that may have different types of tensile elements. As used herein, the term "strength component" means the strength element has anti-buckling strength, while the term "strength member" means the strength element lacks anti-buckling strength and is for example used for tensile strength. Furthermore, the term "tensile element" means either a strength component or a strength member. An example of a strength component is a glass-reinforced plastic (GRP) rod and an example of a strength member is a tensile yarn for example Kevlar®-.

FIGS. 15 and 16 depict fiber optic cable 40' having one or more strength components 44 such as GRP rods disposed between a first shell 55a and a second shell 55a of crimp body 55. As shown, cable 40' has the optical fiber attached to the connector assembly 52 and is positioned within a first shell 55a. In this explanatory embodiment, cable 40' has a generally flat construction, but may have oval, trilobal or other suitable shapes with an optical component 42 having strength components 44 disposed on opposite sides of the optical component 42, which are generally surrounded by a cable jacket 48. As best shown in FIG. 15, shells 55a have recesses or passageways for receiving the strength components 44 therein and a first end for securing connector assembly 52 therebetween. The alignment of shells 55a is accomplished by one or more pins 57c that fit within one or more complementary bores 57d that may be formed in the shells 55a or the pins may be discrete components as desired. In advantageous embodiments, the shells can be symmetrical so only one mold is needed for making both shells. FIG. 16 depicts both shells disposed about the strength components 44 of cable 40'. Shells 55a may be secured in any suitable manner such as by a crimp band 54 and/or adhesive as desired. Shells 55a may also include one or more bores 56d so that excess adhesive may escape if used for securing the crimp body 55. As shown, the optional crimp band 54 is slid onto cable 40' prior to placing the cable in the shell 55a and then can be slid over the crimp body as represented by the arrow before being deformed about the crimp body.

FIG. 17 depicts another type of cable construction that may be advantageously preconnectorized with the female hardened connector 150 disclosed herein. The fiber optic cable shown has an optical fiber (not visible) attached to the connector assembly 52, a plurality of strength members 45 such as aramid yarns like Kevlar®, and a cable jacket 48 having a generally round cross-section. As shown, strength members 45 are disposed about an outer barrel 55o of crimp body 55. Thereafter, a crimp band 54 may be slid over the strength members 45 as represented by the arrow so that the strength members 45 are attached between outer barrel of the crimp body 55 and the crimp band 54 is deformed to secure the strength members 45.

Other cables can be used with the female hardened connector disclosed herein. For instance, cable assemblies disclosed herein may include a fiber optic cable having a subunit surrounded by an upjacketed portion. The subunit includes at least one optical fiber and a plurality of tensile yarns such as Kevlar, fiberglass, or the like disposed within a subunit jacket. In other words, the tensile yarns form a portion of the subunit and are internal to the subunit jacket. The upjacketed portion of fiber optic cable includes strength components such as glass-reinforced plastic (GRP) members having anti-buckling strength disposed about the subunit (i.e., disposed radially outward of the subunit) and within a jacket. The strength components are disposed on opposite sides of the subunit in a generally linear arrangement. Specifically, the subunit is round and the strength components are disposed on opposite sides of the subunit and jacket has a generally flat profile. Of course, variations on this cable are possible. By way of example, the at least one optical fiber can optionally include a buffer layer with a diameter greater than 250 microns for providing further protection to the optical fiber such as 500, 700 or 900 microns, but other nominal sizes are possible. As another example, the jacket of the upjacketed portion may have other cross-sectional profiles besides generally flat such as round, oval, trilobal, etc. Moreover, the female hardened connector may terminate more than one optical fiber.

Using cables with a subunit has advantages. For instance, the subunit of the cable may be broken out from the cable for attaching a second connector to a second end of the subunit. This ability to break-out the subunit and attach a different type of fiber optic connector is advantageous for routing the cable assembly from an indoor location such at the central office and to an outdoor location where a female hardened connector is desired. Simply stated, a portion of subunit is broken-out from the second end of the cable assembly and there is no need to strain-relieve (i.e., attach) the upjacketed portion of the cable since the tensile yarns of the subunit are strain-relieved. Moreover, the subunit provides a much smaller and highly flexible fiber optic cable at the second end of the cable assembly for deployment. Further, any of the embodiments can use any suitable connector assembly such as a SC or a LC connector assembly having a ferrule and a connector housing along with other suitable components.

The strength components of the upjacketed portion are exposed from the upjacketed portion and then disposed between first shell 55a and second shell 55a as described and illustrated. An optional crimp band 54 may be used for securing the shells 55a of crimp body 55 as desired. Additionally, as discussed an adhesive or bonding agent may be used with or without crimp band 54 to attach or secure strength component disposed between shells 55a.

Also, the plurality of tensile yarns of a subunit are attached to the crimp body 55. By way of example, some of the plurality of tensile yarns are attached between crimp body and crimp band as discussed herein. The ends of the tensile yarns are sandwiched/disposed between the outer barrel of the crimp body 55 and crimp band 54 and then the crimp band is secured (i.e., crimped) to strain-relieve the tensile yarns. As desired, the optical fibers of a subunit may enter a protective tube at least partially disposed within the crimp body. In other words, a buffer layer on optical fiber is threaded through (i.e., enters) a protective tube and at least partially disposed within crimp body 55. Protective tube can have any suitable size, shape or length as desired that allows for suitable performance with optical fiber. The buffer layer may also enter the connector assembly 52 as desired, but the subunit jacket does not enter the crimp body 55. Moreover, the geometry of shells 55a of crimp body 55 can be modified for the particular embodiments shown to provide adequate sizing of passageways and the like for the various embodiments.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the disclosure without departing from the spirit and scope of the same. Thus, it is intended that the disclosure cover the modifications and variations of this invention provided they come within the scope of the appended claims and their equivalents.

We claim:

1. A female hardened fiber optic connector, comprising:
   a connector assembly;
   a crimp body having a first shell and a second shell for securing the connector assembly at a front end of the shells and a cable attachment region rearward of the front end;
   a shroud having alignment fingers on a first end and a locking feature extending outwardly from a rim area of the shroud, wherein the crimp body fits within a portion of the shroud and is secured therein by the locking feature; and
   a female coupling nut having an internal attachment feature.

2. The female hardened fiber optic connector of claim 1, the locking feature being one or more integrally formed clips for securing the crimp body.

3. The female hardened fiber optic connector of claim 1, further including a receptacle having a non-hardened receptacle port on a first side and a hardened receptacle port on a second side.

4. The female hardened fiber optic connector of claim 3, wherein the alignment fingers are received into discrete openings on the first side of the receptacle.

5. The female hardened fiber optic connector of claim 1, further including a crimp band.

6. The female hardened fiber optic connector of claim 1, being a portion of a cable assembly further including a fiber optic cable attached to the hardened fiber optic connector.

7. The female hardened fiber optic connector of claim 6, wherein the fiber optic cable includes strength members secured to the cable attachment region.

8. The female hardened fiber optic connector of claim 7, a tensile element of the fiber optic cable being a plurality of tensile yarns attached between an outer barrel of the crimp body and a crimp band or one or more strength components disposed between the first shell and the second shell of the crimp body.

9. The female hardened fiber optic connector of claim 6, wherein the first shell and second shell are secured using a crimp band and/or an adhesive.

10. The female hardened fiber optic connector of claim 6, wherein the fiber optic cable has an optical fiber having a buffer layer that enters the crimp body and enters the connector assembly.

11. The female hardened fiber optic connector of claim 6, the cable assembly further includes a boot.

12. A method of making a hardened fiber optic connector assembly, comprising:
    providing a fiber optic cable having at least one optical fiber;
    providing a female hardened fiber optic connector that includes a connector assembly, a crimp body having a first shell and a second shell for securing the connector assembly at a front end of the shells and a cable attachment region rearward of the front end, and a shroud having alignment fingers on a first end and a locking feature extending outwardly from a rim area of the shroud, wherein the crimp body fits within a portion of the shroud and is secured by the locking feature and a female coupling nut having an internal attachment feature;
    attaching the at least one optical fiber to the connector assembly; and
    securing the connector assembly between the first shell and second shell.

13. The method of claim 12, the female hardened fiber optic connector wherein the locking feature being one or more integrally formed clips for securing the crimp body.

14. The method of claim 13, the hardened fiber optic connector assembly further including a receptacle, wherein the receptacle has a non-hardened receptacle port on a first side and a hardened receptacle port on a second side.

15. The method of claim 14, wherein the alignment fingers are received into discrete openings on the first side of the receptacle.

16. The method of claim 12, further including tensile elements in the fiber optic cable and strain-relieving at least some of the tensile elements of the fiber optic cable to the crimp body.

17. The method of claim 16, the tensile elements being a plurality of tensile yarns attached between an outer barrel of the crimp body and a crimp band or one or more strength components disposed between a first shell and a second shell of the crimp body.

18. A hardened fiber optic connector assembly, comprising:
    a fiber optic cable having at least one optical fiber
    a female hardened fiber optic connector attached to the at least one optical fiber of the fiber optic cable, the female hardened fiber optic connector, comprising:
    a connector assembly;
    a crimp body having a first shell and a second shell for securing the connector assembly at a front end of the shells and a cable attachment region rearward of the front end; and
    a shroud having alignment fingers on a first end and a locking feature extending outwardly from a rim area of the shroud, wherein the crimp body fits within a portion of the shroud, and the locking feature is one or more integrally formed clips for securing the crimp body within the shroud.

19. The female hardened fiber optic connector assembly of claim 18, further including a female coupling nut having an internal attachment feature.

20. The female hardened fiber optic connector assembly of claim 19, further including a receptacle having a non-hardened receptacle port on a first side and a hardened receptacle port on the second side.

21. The female hardened fiber optic connector assembly of claim 20, wherein the alignment fingers are received into discrete openings on the first side of the receptacle.

22. The female hardened fiber optic connector assembly of claim 18, the wherein the fiber optic cable includes one or more tensile elements secured to the cable attachment region.

23. The female hardened fiber optic connector assembly of claim 22, the tensile elements being a plurality of tensile yarns attached between an outer barrel of the crimp body and a crimp band or one or more strength components disposed between a first shell and a second shell of the crimp body.

24. The female hardened fiber optic connector assembly of claim 18, wherein the first shell and second shell are secured using an adhesive or a crimp band.

\* \* \* \* \*